United States Patent

Nissle et al.

[15] 3,684,252
[45] Aug. 15, 1972

[54] DESOLVENTIZING APPARATUS

[72] Inventors: William N. Nissle; Robert K. Slaby; Dean K. Bredeson, all of Piqua, Ohio

[73] Assignee: The French Oil Mill Machinery Company, Piqua, Ohio

[22] Filed: Sept. 4, 1970

[21] Appl. No.: 69,857

[52] U.S. Cl. ................................................... 259/9
[51] Int. Cl. .............................................. B01f 7/08
[58] Field of Search............259/9, 10, 25, 26, 45, 46, 259/109, 110; 260/85.3, 93; 18/2 D, 2 EM, 3 ES, 2 MR, 2 V; 23/274

[56] References Cited

UNITED STATES PATENTS

| | | | |
|---|---|---|---|
| 3,222,797 | 12/1965 | Zies | 34/17 |
| 3,323,222 | 4/1967 | Skidmore | 34/17 |
| 3,392,862 | 7/1968 | Fritsch | 259/9 |
| 3,447,582 | 6/1969 | Street | 159/7 |
| 3,505,085 | 4/1970 | Straughn | 259/9 |

*Primary Examiner*—Robert W. Jenkins
*Attorney*—Marechal, Biebel, French & Bugg

[57] ABSTRACT

Polymers containing volatile solvents or the like are fed into a cylindrical cage and carried through the cage by screw members past injectors which add a desolventizing agent to the polymer. This agent is mixed into the polymer and the polymer is then forced through a circular ring, which is axially adjustable, forming an annular restriction which exits into a vented section of the cage where pressure on the polymer is substantially reduced and the volatile solvent escapes through slit-like vent openings to be collected and returned to solvent recovery apparatus. This arrangement is repeated through a second set of injectors, mixing screws, and vent section. The polymer may have compounding agents, such as an oil, injected and mixed into it, either in the same apparatus, or in a second machine, and either before or after the desolventizing steps.

14 Claims, 5 Drawing Figures

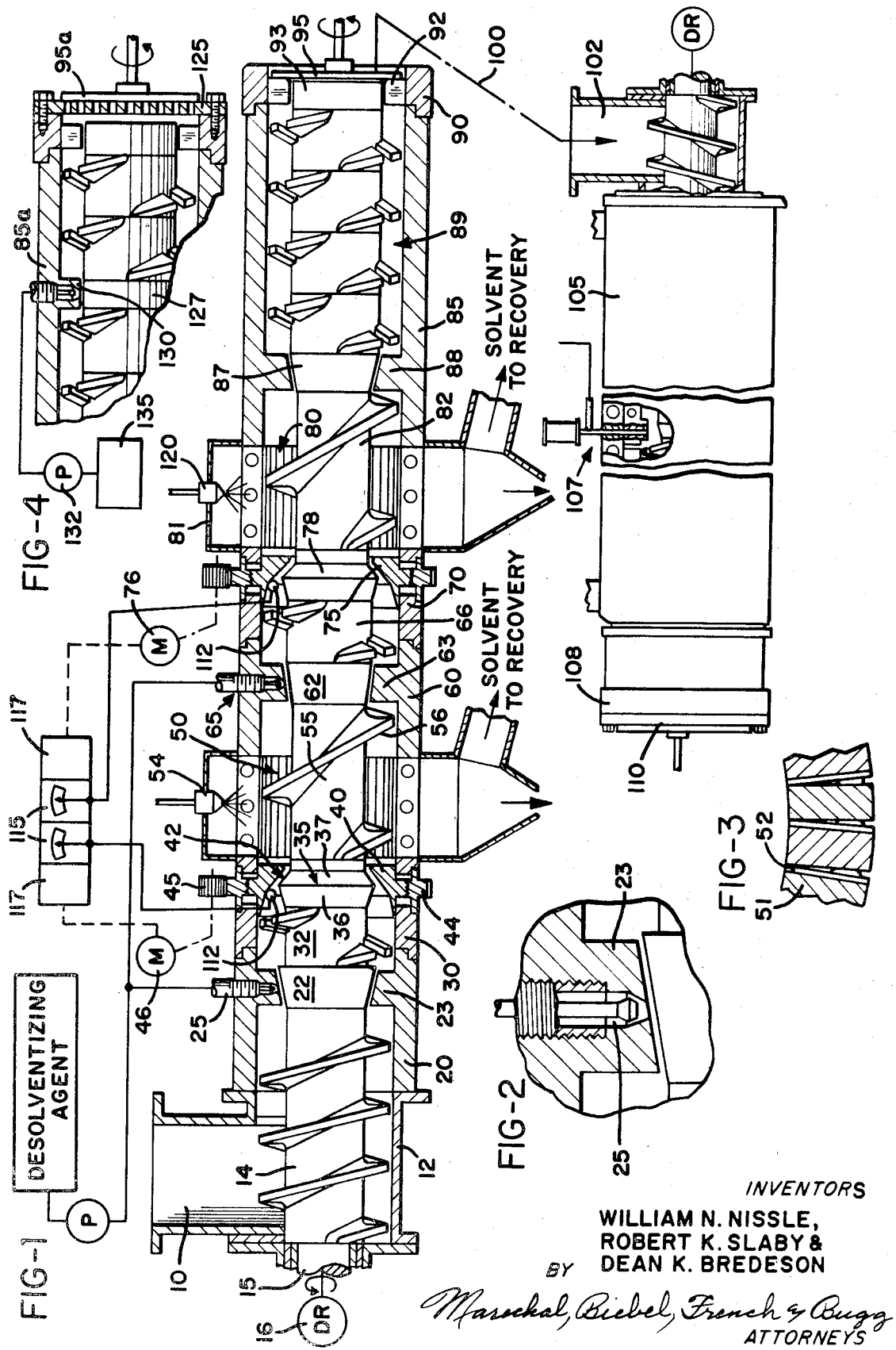

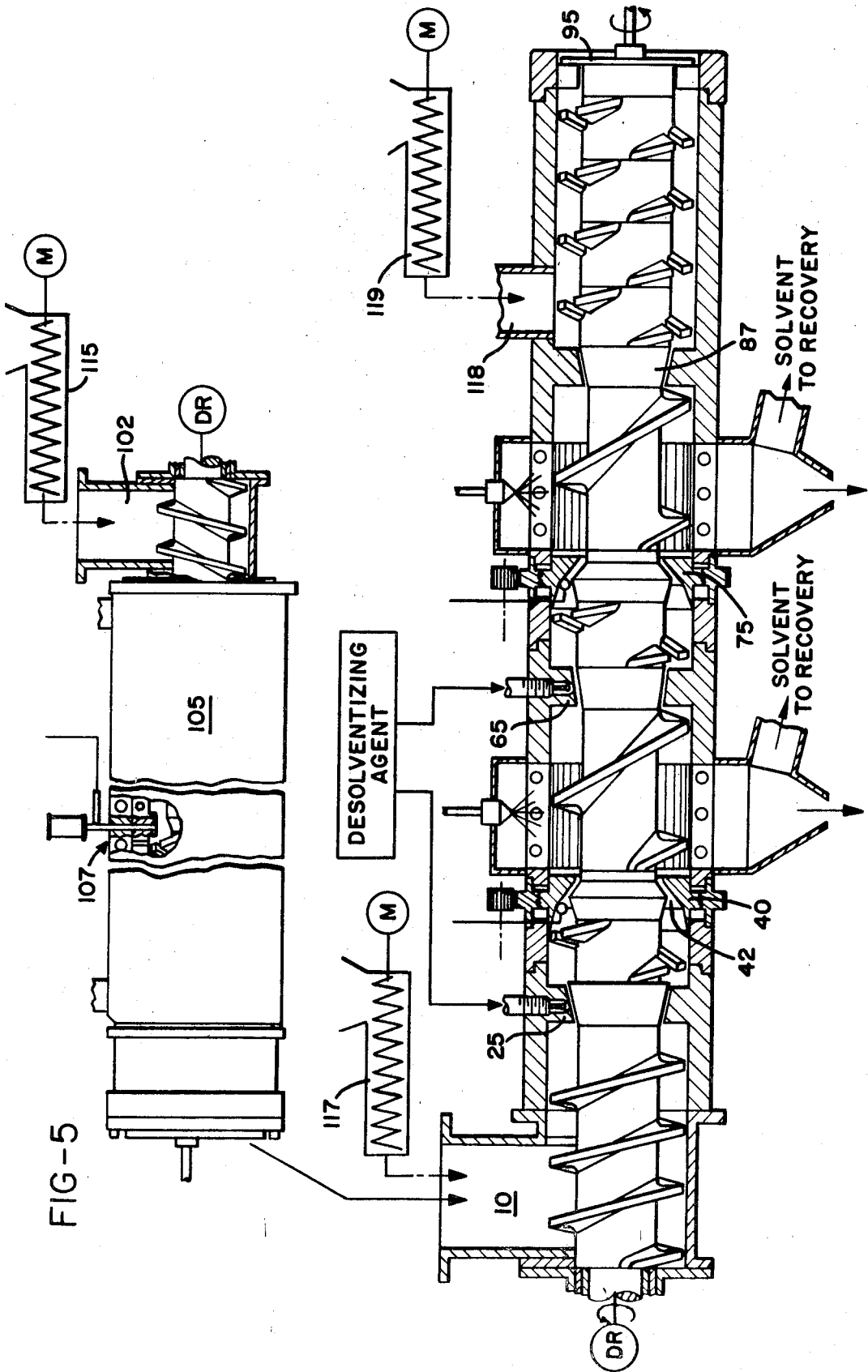

DESOLVENTIZING APPARATUS

CROSS REFERENCE TO RELATED APPLICATION

This application is related to copending application Ser. No. 69806, filed Sept. 4, 1970, entitled METHOD OF REMOVING VOLATILES FROM AN ELASTOMER, in the name of Charles R. Johnson, and assigned to The Firestone Tire and Rubber Company.

BACKGROUND OF THE INVENTION

This invention relates to continuous removal of volatile liquids (e.g., hydrocarbons) from various polymers, as in production of solution polymerized polymers, such as styrene-butadiene rubber (often called SBR), polybutadiene, polyisoprene, copolymers of butadiene or isoprene with styrene, chloroprene rubber, butyl rubber or EPDM. In the production of such elastomeric polymers the solution polymerized material usually is run through a steam stripping operation, for example by conveying the solvent containing polymer into a flash tank of hot water, whereupon the volatile solvent is steam stripped from the polymer, and the polymer takes up a substantial quantity of water. The water is then removed from the resultant polymer slurry by various processes. In coming from the solution polymerization step, the polymer contains a substantial amount of solvent, which in the case of solution polymerized SBR usually is hexane. This can be reduced to a solvent content of about 15 percent without water stripping, but for a commercially useful product it is necessary to reduce the amount of solvent in the material to 0.50 percent or less.

The above described stripping process is capable of so reducing the solvent content of the polymer, however it involves a number of consecutive steps, substantial equipment, and a need to supply large quantities of hot water or steam. But then the water must be removed from the polymer. Furthermore, although the released solvent is recoverable from the steam stripping step, only a certain percentage of the solvent can be recovered.

One of the factors involved in the processing of the various polymers is the necessity to avoid the formation of gel, which will occur if the polymer is overheated. For example, if during the processing of SBR a temperature in the order of 425° F. is reached, there can be formation of gel in amounts sufficient to impair its commercial acceptability. Due to its higher boiling point, removal of water from the polymer requires more heat input than is needed to flash off the volatile solvents.

If various compounding agents, such as carbon black, are to be added to the polymer, this is conventionally accomplished with high shear batch type machines, typified by the well-known Banbury mixer. These machines require a relatively high power input and they do not readily accommodate to continuous processing operations.

SUMMARY OF THE INVENTION

In accordance with the present invention, the solution polymerized elastomeric polymers are desolventized or devolatized in a continuously operating machine, a specially designed screw press, directly to a useful polymer product, without the need for the steam stripping operation.

The polymer, containing typically from 8 percent upward to 50 percent solvent, is supplied to a special continuous screw press, and the material is mechanically worked to heat it. During this operation a quantity of desolventizing agent, for example an inert gas such as nitrogen, or steam, or water, is added to the polymer and worked into the polymer. This is accomplished in a closed apparatus, and the polymer is then passed through a restriction where a thin film of the polymer is forced into a vented expansion section, which section is kept partially voided by the design of the apparatus.

The volatile solvent escapes from the material, along with any devolatizing or desolventizing agent which may have transformed to the gaseous state, and is vented into a collection chamber or housing around the outside of the press cage, where the gas may be piped to apparatus for recovering the solvent. This process of adding a desolventizing agent, mixing it into the material, and then forcing the material through a thin annular orifice is preferably repeated one or more times, and each time the material is again forced into a vented section, where further solvent escapes from the material, and then the material is finally worked through additional screw members of the machine and discharged through an outlet past a cutter which separates the material into slices.

These slices may then be fed into additional apparatus which works the material further and adds to it a compounding agent, such as for example oil, the resultant oil-polymer mixture being discharged eventually through an orifice or a die and separated into pellets or small pieces which can be collected in various ways, and used in further manufacturing operations.

The screw press apparatus incorporates injection equipment capable of injecting and thoroughly mixing the desolventizing agent in the material. This preferably includes a tapered collar over which the material is forced at the point of injection, followed by one or more notched worm flights which function to mix the polymer and the desolventizing agent thoroughly, while mechanically working and heating it, and also to convey the material forward to a subsequent tapered collar which cooperates with an adjustable ring to form the thin annular orifice, in the order of 0.040 to 0.150 inch. The polymer thus is formed into a thin annular film which enters the vent section following the orifice, where the pressure on this film of material is reduced and the heated solvent can readily escape, along with the desolventizing agent, since there is a maximum of surface area exposed for a given volume of polymer.

The vent section is formed by constructing this region of the press cage with closely spaced screen bars or the like, leaving slit-like openings through which the volatile solvent and desolventizing agent can readily escape, but which will contain the elastomeric polymer. Furthermore, the volume internally of the vent section is increased with respect to the quantity of of polymer passed through it in normal operation, and this can readily be accomplished by providing a screw member having a body of reduced cross-section, leaving a sufficiently large annular space between the screw body and the interior of the screen bars. The screw flights are of an increased pitch in this region, and thus function to take up and accelerate the conveying of the polymer through the vent section, assuring that there is a void in this region, and the vent section is not filled with the polymer. As previously mentioned, this arrangement of parts preferably is duplicated at least once and then the polymer is compacted and worked mechanically past additional collars of increasing cross-section, and adjacent breaker lugs which cooperate with the collars to produce mechanical working of the material, and followed by additional screw or worm flights, which may be notched as desired, in order to produce additional working of the polymer.

In actual operation of a device of this kind, it was found that the temperature of the polymer in the first steps of the desolventizing, in other words in the region of the first annular orifice, was in the order of 240° to 290° F., and adjacent a second orifice the material reached a temperature of 260° to 340° F., well below the gel forming temperature of this particular material.

The material is discharged from the apparatus through or past a plurality of breaker lugs, which function merely to separate the discharging annular stream of polymer into a number of sections, and a rotating cutter knife cuts these sections into slices, which can then be cooled and baled or may be fed to the compounding apparatus.

By employing adjustable orifice rings within the apparatus, it is possible to control the thickness of the thin annular films forced into the vent sections. This is important to minimize the impedance of the polymer to the escaping solvent vapors. This in turn also provides a control over the back pressure in the preceding operation where the desolventizing agent is added and forceably mixed into the material. This back pressure control in turn provides control over the temperature to which the polymer is raised, thus providing an apparatus which is flexible in operation and capable of handling various solution polymerized materials which may have slightly different characteristics as to the temperature to which the material can be raised without damage, or different physical properties such as viscosity and fragility.

It has been found that, with a given design of screw press, effective desolventizing can be achieved on materials having higher Mooney viscosity at lower temperatures and with lower power input requirements. The ability to adjust the thickness of the thin annular film provides control over the energy transferred into the polymer (as heat) to attain the proper temperature for desolventizing. Thus it is economically advantageous to work with polymers of higher Mooney viscosity in the desolventizing process, and then to compound the polymer by addition of oil or other softener to obtain lower Mooney end product if desired. This operation can be accomplished either in a subsequent injection press, or at a point in the desolventizing press downstream from the last vented expansion chamber.

In connection with those polymers into which various compounding agents are to be mixed, such as carbon black, zinc oxide, etc., it may be desirable to take advantage of the presence of a large quantity of solvent in the polymer, which functions as a softening and transferring agent, to facilitate the mixing of such materials into the polymer. By way of illustration, mixing carbon black into the polymer requires substantial power. This type of material is abrasive and tends to thicken the polymer and increase its viscosity. Mixing such materials into the polymer requires substantial horsepower, and also has a wearing effect on the parts of the apparatus. At present, this mixing is achieved with batch type machines such as the Banbury mixer which is a high shear, high horsepower device that operates on a batch process, rather than continuous.

By adding compounding agents such as carbon black to the solution polymerized polymer prior to desolventizing, in a continuous screw machine, the solvent acts as a transferring agent and promotes the thorough mixing of such compounding ingredients into the polymer. Then the polymer can be passed into the desolventizing press, as previously described, and the appropriate desolventizing agent is added, mixed into the polymer, and the polymer discharged as a thin film into a vented expansion chamber, thereby promoting the release of the volatile solvent. Again, this operation is preferably repeated at least once. If it is desired to add a sulfur accelerator, or some similar agent, this can be accomplished near to the discharge of the desolventizing apparatus, such that the accelerator is thoroughly mixed into the polymer, but only just prior to its discharge from the apparatus.

Therefore, the addition of compounding agents either before or after the desolventizing press is an option which can be chosen according to the desired economics for a continuous processing system. If carbon black or other such compounding agents are to be added, it is advantageous to do so before desolventizing; if only agents such as oil are to be added, resulting in a lower Mooney viscosity, it may be desirable to do so after the desolventizing since the desolventizing press operates more efficiently on material with a higher Mooney viscosity. The choice is available according to what is best for the overall economics of the system.

The primary object of the invention, therefore, is to provide such an apparatus in which solution polymerized elastomeric polymers can be desolventized from an initial high solvent content to a commercially acceptable level; to provide an apparatus of the screw press type in which this operation can be performed continuously and have commercially acceptable production rates; to provide such an apparatus in which the desolventizing agent is added and mixed into the polymer, and the polymer is then discharged as a thin film into vented expansion chambers, where the volatile solvent can readily escape from the material; to provide such an apparatus in which the volatile solvent and the desolventizing agent are successfully removed in such a state that large quantities of the solvent can readily be recovered and reused; to provide such an apparatus wherein essentially all of the volatile solvent can be removed from a solution polymerized elastomeric polymer without formation of gel in the polymer; and to provide improved apparatus for the addition of compounding agents, such as oil.

Other objects and advantages of the invention will be apparent from the following description, the accompanying drawings and the appended claims.

BRIEF DESCRIPTION OF THE DRAWINGS

FIG. 1 is a somewhat schematic cross-sectional view illustrating a preferred embodiment of screw press apparatus in accordance with the invention, in combination with a subsequent screw press device in which a compounding material such as oil may be added to the polymer;

FIG. 2 is an enlarged sectional view showing a detail of a typical injector;

FIG. 3 is an enlarged sectional view showing the construction of the vent sections of the apparatus shown in FIG. 1;

FIG. 4 is a partial view showing modifications to the apparatus shown in FIG. 1; and FIG. 5 is a view similar to FIG. 1, showing another embodiment.

DESCRIPTION OF THE PREFERRED EMBODIMENT

Referring to FIG. 1, the solution polymerized elastomeric polymer is fed into the hopper 10 which constitutes the inlet of the screw press apparatus, opening into the feed section 12 in which a first or feed screw element 14 is located. This feed screw is carried on and secured to a rotatable shaft 15 which is continuously rotated, during operation of the apparatus, from a drive unit 16 which may include a motor and gear reduction unit (not shown). The shaft 15 extends the full length of the apparatus.

Immediately downstream of the inlet section there is a closed first cage element 20, which receives a portion of the end of the feed screw member 14. It will be noted that the screw flights of this member extend into close proximity with the walls of the first cage section 20. Within this section there is a tapered collar 22, and breaker lugs 23 extend from the walls of the cage into close proximity with the surface of the tapered collar 22. The taper assures that the cage is full at this location. At least one of these breaker lugs may also function as the mounting for an injector 25, some details of which are shown in FIG. 2. This injector may be of the type shown in greater detail in the copending U.S. Pat. application Ser. No. 802,029, filed Feb. 25, 1969, and assigned to the assignee of this application. The discharge of the injector is within the bore of the cage, to assure good mixing in of the injected agent.

In general, the injector functions to admit a desolventizing agent to the interior of the press cage, while preventing outflow of the polymer due to the pressurized injection of the agent. In this particular case the desolventizing agent may be an inert gas such as nitrogen, or steam, which is inert with respect to the polymer, or in some cases water will also function in this manner, since water is essentially immiscible with the polymer and not reactable with it. The desolventizing agent acts to sweep the volatile solvent from the polymer in the subsequent operation and also may cool the polymer if desired. Further details are found in the aforementioned copending application of The Firestone Tire and Rubber Company.

Connected to the section 20 is a further cylindrical section 30 which partially surrounds the notched worm member 32 that follows the collar 22. The worm flight preferably is notched, as shown, to promote mixing and mechanical working of the polymer in this region. This results in heating of a polymer in addition to thorough mixing of the agent with it.

Downstream from the worm member 32 there is a further collar member 35 having a first outwardly tapered portion 36 and a second inwardly tapering portion 37. An adjustable ring ro choke member 40 cooperates with this second tapered portion 37 to form a thin annular orifice 42 through which all material must pass; such a choke member is disclosed in U.S. Pat. No. 3,518,936, issued July 7, 1970. The ring 40 is mounted through suitable threads to an outer rotatable ring 44 which has an external gear section that can be rotated through the pinion 45 driven from a suitable motor or similar power source 46. Rotation of the pinion will produce longitudinal movement of the ring 40, thereby adjusting the size of the annular orifice 42.

By way of example, a mixture of SBR-hexane and an injected desolventizing agent such as water was forced through the orifice 42 as a relatively thin film, having a thickness in the order of less than 0.150 inch. In one successful arrangement, the most effective thickness of this annular orifice was approximately 0.085 inch. The film may advantageously be thinner or be thicker when operating on other materials with other solvents and agents.

Immediately downstream from the orifice 42 there is a vent section 50 formed in the walls of the press cage. This vent section preferably is constructed of a plurality of parallel screen bars 51, separated by suitable spacers 52, as shown in the detailed view in FIG. 3. This construction is well known in the art of expressing screw presses. It provides narrow slit-like openings, extending longitudinally of the cage, through which gases and liquids can escape. In this case, the volatile solvent, along with the gases or vapors formed from the desolventizing agent, are released as the thin film of polymer expands in the region of the vent section 50, thereby permitting the gases to escape to the exterior of the cage. These are collected in the surrounding housing 54, to be piped to a solvent recovery system (not shown).

To assure that the vent section is at all times partially void of material, in order to allow for the desired expansion, the worm member 55 within this section is provided with a worm flight 56 of substantially greater pitch and smaller body diameter. Since all of the worm flights are driven from the shaft 15, the greater pitch of the flight 56 will cause an accelerated motion or conveying of the polymer through the vent section 50, tending to evacuate material therefrom at a greater rate than it is supplied, thus maintaining the desired lower pressure region within the vent section.

The worm member 55 extends partially into the next cage section 60, which is an imperforate section much like the first section 20. It surrounds a tapered collar member 62, which, like the collar 22, has breaker lugs 63 extending toward it, and at least one of these breaker lugs can provide a mount for an additional injector 65 which is of the same type as the injector 25. This provides for a second state of injection of the desolventizing agent. It has been found in practice that the best results are achieved through the use of at least two states of injection, working, and expansion of the polymer and desolventizing agent.

Following the collar 62 there is another notched flight worm member 66, which extends into the cage section 70 providing an adjustable mounting for the second ring member 75 which can be moved longitudinally, through the same type of drive from a motor 76. This second ring member cooperates with a further tapered collar member 78, in the same manner as previously, to form another thin annular orifice through which the material is forced. A second vent section 80, also constructed of screen bars as the section 50, follows the second orifice, and provides a vent section in which the polymer is allowed to expand, with consequent escape of the volatile solvent and any gases resulting from the desolventizing agent. The escaping gases are collected in housing 81, and also piped to the solvent recovery system.

Again, a longer pitch worm member 82 extends through the second vent section, and into the final barrel section 85, forcing the material at a greater rate toward the tapered collar 87 which cooperates with breaker lugs 88. Following collar 87 there are a series of screw members, preferably, although not necessarily, having notched screw flights. These further screw members are designated by the general reference numeral 89. The end ring 90 is provided with a plurality of circumferentially spaced stationary lugs 92 that extend inwardly toward the end cap or collar 93 on the shaft 15. These lugs 92 serve to divide the exiting material, which has formed into a compact mass, into a plurality of sections which are cut into slices by a rotating knife 95, which is mounted immediately outside the lugs 92 at the outlet from the cage. The construction and arrangement of the knife and its drive can be of the general type shown in copending U.S. Pat. application Ser. No. 753,647, filed Aug. 19, 1968 now Pat. No. 3,574,891, and assigned to the assignee of this application.

The slices of desolventized polymer are fed, as indicated generally by the dot-dash lines 100, into the inlet hopper 102 of a further screw press machine 105. This machine is of the general type disclosed in the aforementioned patent application Ser. No. 802,029. It is provided with at least one injector 107 for the purpose of adding a compounding substance, such as oil, to the polymer being worked and advanced through the screw press 105. The material discharges from the press 105 through a suitable die 110 within the discharge housing 108, and the material passing from the die can be formed into suitable ribbons, or cut into suitable pellets, as desired.

Since the screw press machine functions to work the polymer by reason of the mechanical interaction of the notched worm flights, the collars and breaker bars, and in general the process of conveying the polymer through the cage, a considerable amount of heat is transferred to the material. In actual operations it has been found not necessary to add additional heat to the material by jacketing of the press cage, nor to provide cooling for the same purpose. It should be understood, however, that steam or hot water jacketing is an ordinary feature, which may be provided generally as shown in U.S. Pat. No. 3,225,453, and it may be desirable to provide such an arrangement, for example, to aid in the quick starting of the apparatus when it is put into production operation.

Another desirable feature is provided by the placement of temperature sensors, such as thermocouples 112 in the region of the orifice provided by the adjustable rings 40 and 75. These thermocouples can be connected to conventional meters to read out in terms of the temperature of the material, as indicated generally at 115. If it is desired to automate the adjustment of the rings, then the output of the thermocouples can also be applied to a conventional controller 117 connected to control the motors 46 and 76, respectively. Preferably, the controller is operable within a specified temperature range, and will maintain the position of the corresponding ring until the indicated temperature of the material in the region of the ring either exceeds or goes below a predetermined range, at which time the appropriate control motor will be actuated in the proper direction to open or close the corresponding orifice.

Another auxiliary feature is the provision of spray heads 120 within the housings 54 and 81, arranged to spray a liquid such as hot oil, hot water, or some other liquid solvent, against the exterior of the screen bars 51. This spray serves to clean fines from the escaping gaseous solvent, with the fines clinging to the drops of liquid. This action minimizes the quantity of fines in the solvent returned from the housings 54 and 81, and thus tends to avoid fouling of condensor tubes or other equipment in the solvent recovery apparatus. The spray also tends to wash away or dissolve fines or other small particles of polymer which may occur at the exterior of the screen bars if small amounts of polymer are extruded through the vent openings.

Where greatest throughput of pure polymer is desired, the addition of oil or other compounding substances to the polymer preferably is accomplished after the desolventizing, as previously explained. It has been discovered that polymers having a lower Mooney number generally require more power input from the press drive. Thus, it is economically advantageous to run polymeric material with a higher Mooney viscosity through the apparatus, then add oil or other softening substances afterward to achieve a product of lower Mooney viscosity as may be desired.

In some instances it may be desirable to add the compounding substances all in one operation, in a single piece of apparatus. In FIG. 4 an alternative construction is shown, wherein the barrel 85a is fitted with a die plate 125 that cooperates with the rotating knife 95a. Upstream, between the final worm members, there is a collar 127 mounted on the shaft, and a suitable injector 130 is provided opposite this collar to supply the extending substance under pressure from a pump 132 which draws from a supply tank 135. Thus, the entire operation of desolventizing and oil extension can be accomplished in one continuous piece of apparatus.

As previously mentioned, if certain compounding agents are to be added to the polymer, it may be more efficient to do this before desolventizing. FIG. 4 illustrates one typical arrangement of this type, wherein solid compounding agents are added, such as carbon black and zinc oxide, along with liquid agents such as oil, and after desolventizing and accelerator such as sulfur is added just before the polymer is discharged from the desolventizing press.

Much of the apparatus is the same as in FIG. 1, therefore the same reference numerals are applied to the same parts. In general, the compounding press 105 precedes the desolventizing press and discharges into it. The solvent-polymer mixture is fed into the inlet 102, along with an appropriate amount of carbon black or other solid material from the screw feeder 115. Oil or other liquid compounding agents can be added through injector 107. The solvent, in amounts up to about 50 percent of the mixture, acts as a softening and transfer agent to promote thorough mixing of the carbon black into the mixture.

The mixture is discharged into the inlet 10 of the desolventizing press, and additional solid (powdered) compounding agent, such as zinc oxide, can be added at this point from the feeder 117. The mixture is then worked, the desolventizing agent injected at 25, and mixed into the material which proceeds through the orifice 42 into expansion chamber where the pressure is relaxed and solvent escapes through the vent openings.

The arrangement preferably is repeated as before, with further injector 65 serving to add more desolventizing agent, followed by the second ring 75 defining the second orifice into the next expansion chamber 80. In the final section 85, after collar 87, an inlet 118 is provided for addition of a sulfur accelerator or the like, supplied from a feeder 119, just prior to the discharge of the desolventized compounded polymer past knife 95. The accelerator is added last, such that it will be mixed into the compounded polymer with a minimum of residence time in the press, to avoid pre-curing the polymer.

While this arrangement requires somewhat more power input to the desolventizing press, due to the lower Mooney viscosity of the material being handled, plus addition of the abrasive solid compounding agents, the amount of power required for the compounding press is significantly less than the power heretofore needed to do the same type of compounding and mixing in a Banbury or similar batch type high shear mixer. In addition there is the advantage of continuous compounding instead of a batch operation. The overall efficiency of this apparatus is, therefore, still significantly improved over prior art devices.

While the forms of apparatus herein described constitute preferred embodiments of the invention, it is to be understood that the invention is not limited to these precise forms of apparatus, and that changes may be made therein without departing from the scope of the invention, which is defined in the appended claims.

What is claimed is:

1. An apparatus for the continuous removal of a volatile substance from a polymer, said apparatus including a cylindrical cage having an inlet and an outlet, a rotatable shaft carrying a plurality of screw members arranged to convey the polymer through said cage, said screw members having a body and a screw flight thereon, collars on said shaft located between said screw members, a plurality of axially adjustable rings within said cage forming spaced apart annular restrictions in cooperation with certain of said collars at which the polymer is subjected to locally increased pressure,
   the improvement comprising
   injectors located upstream from each of said rings providing for addition of a desolventizing agent to the polymer,
   said screw members between said injectors and said rings being arranged to mix the desolventizing agent into the polymer,
   vent means extending through the walls of said cage immediately downstream from each of said rings defining vent sections for escape of the volatile substance and desolventizing agent from said cage,
   and the screw members extending through said vent sections having flights of increased pitch to accelerate the conveying of the polymer through said vent sections.

2. Apparatus as defined in claim 1, said vent means being formed as a series of screen bars and separators providing slit-like openings through the walls of said cage.

3. Apparatus as defined in claim 2, including housings around said vent sections for collecting the escaping volatile substance.

4. Apparatus as defined in claim 1, wherein the internal volume of said vent sections is substantially greater than the volume of the cage sections preceding said rings whereby the mechanical pressure on the polymer is relaxed within said vent sections.

5. An apparatus for the removal of a volatile substance from a polymer, said apparatus including a cylindrical cage having an inlet and an outlet, a rotatable shaft carrying screw members arranged to convey the polymer through said cage, collars on said shaft intermediate said screw members and breaker lugs adjacent said collars, rings within said cage cooperating with certain of said collars forming spaced apart annular restrictions at which the polymer is subjected to locally increased pressure,
   the improvement comprising
   injectors located upstream from each of said rings providing for addition of a desolventizing agent to the polymer,
   the screw members between said injectors and said restructions having notched screw flights to mix the desolventizing agent into the polymer,
   vent means in the form of small openings around said cage immediately downstream from each of said restrictions defining vent sections for allowing escape of the volatile substance and desolventizing agent from said cage while containing the polymer,
   the screw members extending through said vent sections having screw flights of increased pitch to accelrate the conveying of the polymer through said vent sections,
   and a housing surrounding at least said vent sections to collect the escaping volatile substance and desolventizing agent.

6. Apparatus as defined in claim 5, including a further injector located downstream from the last of said vent sections and adapted to inject a compounding substance into the polymer.

7. Apparatus for the removal of a volatile solvent from a solution polymerized elastomeric polymer, comprising
   an elongated closed cage,
   a rotatable shaft extending through said cage,
   a plurality of spaced apart screw members carried on and connected to said shaft,
   said screw members having screw flights extending into closely spaced proximity to the walls of said cage,
   collars on said shaft between said screw members,
   vent means formed in said cage immediately downstream of one of said collars providing a vent section, the screw member preceding said one collar having a notched flight to promote mixing and working of the polymer, and an adjustable ring cooperating with said one collar to form a small orifice through which the polymer must enter said vent section.

8. Apparatus as defined in claim 7, including an injector located upstream of said notched flight for adding a desolventizing agent to the polymer as it is mixed and worked by said notched flight.

9. Apparatus as defined in claim 7, including a compounding device receiving the desolventized polymer and having a further injector adapted to add a compounding substance to the polymer and mixing means for mixing the compounding substance into the polymer.

10. Apparatus as defined in claim 9, wherein said compounding device is a separate screw press receiving desolventized polymer from said cage.

11. Apparatus as defined in claim 9, wherein said compounding device is incorporated in said cage downstream of said vent means.

12. Apparatus as defined in claim 7, including a compounding screw press preceding said cage and discharging thereinto, means for supplying the solvent-polymer mixture to said compounding press, means for supplying a solid compounding agent into said compounding press for mixing into the solvent-polymer mixture prior to desolventizing.

13. Apparatus as defined in claim 12, including means for injecting a liquid compounding substance into the solvent-polymer mixture in said compounding press.

14. Apparatus as defined in claim 12, including means for adding an accelerator substance to the desolventized polymer downstream from said vent section.

* * * * *